United States Patent
El Safty

(10) Patent No.: US 11,555,475 B2
(45) Date of Patent: Jan. 17, 2023

(54) TURBINE

(71) Applicant: C I CORPORATION PTY LTD, Southport (AU)

(72) Inventor: Ahmed El Safty, Queensland (AU)

(73) Assignee: C I CORPORATION PTY LTD, Southport (AU)

( * ) Notice: Subject to any disclaimer, the term of this patent is extended or adjusted under 35 U.S.C. 154(b) by 26 days.

(21) Appl. No.: 16/466,580

(22) PCT Filed: Dec. 20, 2017

(86) PCT No.: PCT/AU2017/051423
§ 371 (c)(1),
(2) Date: Jun. 4, 2019

(87) PCT Pub. No.: WO2018/112530
PCT Pub. Date: Jun. 28, 2018

(65) Prior Publication Data
US 2019/0345909 A1     Nov. 14, 2019

(30) Foreign Application Priority Data
Dec. 20, 2016 (AU) ................. 2016905270

(51) Int. Cl.
*F03B 3/08* (2006.01)
*F01D 1/32* (2006.01)
*F01D 1/34* (2006.01)

(52) U.S. Cl.
CPC .................. *F03B 3/08* (2013.01); *F01D 1/32* (2013.01); *F01D 1/34* (2013.01); *F05B 2240/242* (2013.01); *F05B 2240/30* (2013.01); *F05B 2260/302* (2013.01); *F05B 2260/404* (2013.01); *F05D 2220/31* (2013.01)

(58) Field of Classification Search
CPC ...... F01D 1/32; F01D 1/34; F03B 3/08; F05B 2240/242; F05B 2240/30; F05B 2260/404; F05B 2260/302
See application file for complete search history.

(56) References Cited

U.S. PATENT DOCUMENTS

| 469,404 A | 2/1892 | Irish |
| 2,767,906 A | 10/1956 | Doyle |
| 4,336,039 A | 6/1982 | Sohre |

(Continued)

FOREIGN PATENT DOCUMENTS

| CN | 1780975 A | 5/2006 | |
| CZ | 302324 B6 * | 3/2011 | ............... F01D 1/32 |

(Continued)

OTHER PUBLICATIONS

Notification of Transmittal of the International Search Report and the Written Opinion of the International Searching Authority from corresponding PCT/AU2017/051423 dated Feb. 13, 2018.

*Primary Examiner* — Brian P Wolcott
(74) *Attorney, Agent, or Firm* — Lando & Anastasi, LLP

(57) ABSTRACT

A turbine rotor assembly including a unitary body including at least one inlet for inlet of a fluid into the rotor assembly and a plurality of flow channels extending through the unitary body and terminating in an outlet portion, the at least one inlet in fluid communication with each of the plurality of flow channels.

13 Claims, 13 Drawing Sheets

(56) References Cited

U.S. PATENT DOCUMENTS

| | | | |
|---|---|---|---|
| 4,768,344 A * | 9/1988 | Stojicic | F01D 1/32 60/624 |
| 5,408,824 A * | 4/1995 | Schlote | F02C 3/165 60/39.35 |
| 6,595,762 B2 | 7/2003 | Khanwilkar et al. | |
| 6,668,539 B2 * | 12/2003 | Schlote | F02C 3/165 60/39.35 |
| 7,722,313 B1 * | 5/2010 | Dilorio | F03B 3/08 415/80 |
| 7,824,149 B2 * | 11/2010 | Brewer | F01D 1/36 415/80 |
| 10,056,817 B2 * | 8/2018 | Sirous | F02C 3/16 |
| 10,544,675 B2 * | 1/2020 | El Safty | F01D 1/32 |
| 10,788,203 B2 * | 9/2020 | Ohman | F01K 23/10 |
| 2003/0033808 A1 | 2/2003 | Schlote | |
| 2005/0169743 A1 | 8/2005 | Hicks | |
| 2006/0230742 A1 * | 10/2006 | Witteveen | F02C 3/16 60/39.35 |
| 2011/0027069 A1 | 2/2011 | Couto et al. | |
| 2013/0121842 A1 | 5/2013 | Tharp | |
| 2015/0037134 A1 * | 2/2015 | Isaev | F01D 1/32 415/1 |
| 2015/0233248 A1 | 8/2015 | El Safty | |
| 2018/0066580 A1 * | 3/2018 | Fritz | H02K 49/102 |

FOREIGN PATENT DOCUMENTS

| | | | |
|---|---|---|---|
| DE | 102009005872 A1 * | 8/2010 | F01D 1/32 |
| DE | 102015204506 A1 | 9/2016 | |
| EP | 2975214 A1 | 1/2016 | |
| FR | 702085 A | 3/1931 | |
| GB | 2491586 A * | 12/2012 | F01D 1/32 |

\* cited by examiner

TURBINE

CROSS-REFERENCE TO RELATED APPLICATIONS

This application is a U.S. National Phase Application under 35 U.S.C. § 371 of International Application No. PCT/AU2017/051423, filed Dec. 20, 2017, which claims priority to Australian Application No. 2016905270, filed Dec. 20, 2016, both of which are hereby incorporated by reference in their entireties for all purposes.

TECHNICAL FIELD

The present invention relates to turbine assemblies and systems which utilise a working fluid for the generation of rotational energy.

BACKGROUND ART

The basic operation of a conventional turbine is that expanding gases or pressurised fluids e.g. vapour stream or pressurised liquid (collectively, known as working fluids) are directed onto blades or set of blades mounted around a drum or shaft. The working fluid enters the turbine chamber where it impinges on turbine blades that are mounted around a centred shaft, causing the shaft to rotate and provide useful work. The turbine shaft work is used to drive devices such as an electric generator that may be coupled to the shaft. The shaft is typically mounted in sealed lubricated bearings on a horizontal axis that are required to be cooled to avoid lubrication failure. The energy that is not used for shaft work comes out in the exhaust as waste heat in the spent working fluid, so these have either a high temperature or high velocity. The movement of the high pressure working fluid and high speed rotation of the bladed turbine create a high amount of noise.

Another type of turbine used at present is the pure reaction turbine where the rotor body is mounted around a stationary working fluid inlet that is centrally located in a channel within the rotating turbine head. The rotor body is provided with peripherally mounted nozzles in fluid communication with the flow channel within the rotor body. Working fluid is introduced into the channel of this type of rotor through a centrally mounted and stationary working fluid inlet and the working fluid flows through the rotor body and out of the peripherally mounted nozzles. The nozzles are directed such that the expelled high pressure working fluid causes thrust and rotation of the rotor. As with the conventional bladed turbine, the rotor is normally coupled to a shaft in order to extract useable shaft work.

One of the main issues with each of the above described turbines and rotor is that the shafts associated with the turbine and rotor, whether the shaft is the central mounting shaft for the turbine blades in the conventional turbine or the stationary working fluid channel inlet of the of the pure reaction turbine, must be supported in some manner allowing both rotation of the shafts or the rotor and also a low friction support mechanism that does not allow the escape of the working fluid. The loss of work output due to the friction can be substantial between the (i) shaft or and its support in the case of a conventional turbine or (ii) the rotor and the stationary working fluid channel inlet for the pure reaction turbine.

In addition, the working fluid for both the above described turbines is limited to only one working fluid.

One other problem with both types of turbines is noise emissions associated with the turbulent movement, supersonic flow and impingement of the working fluid against the blades of the turbine as well as movement of the turbine blades for the conventional axial style of turbines or the super-sonic flow, and rotor arm movement of the pure reaction turbine.

A further problem, particularly with the stationary working fluid inlet and the rotor configuration of the pure reaction turbine, is that the working fluid inlet and rotor need to be sealed to one another to prevent or at least reduce the amount of inlet working fluid losses from the rotor by means other than the peripherally mounted nozzles, which would reduce the turbine efficiency. One way in which this can be achieved is through a complex multi-part arrangement of rotating bearings and sealing members. The bearing-rotating seal configuration of the above described turbines requires frequent maintenance intervals.

Both types of turbines have limited rotational speed by design at a given temperature and pressure of a working fluid and the rotational speed cannot be adjusted without changing the blade configuration or size with respect to conventional turbines or in the case of the pure reaction turbines the rotor arms.

It will be clearly understood that, if a prior art publication is referred to herein, this reference does not constitute an admission that the publication forms part of the common general knowledge in the art in Australia or in any other country.

SUMMARY OF INVENTION

The present invention is directed to a turbine, which may at least partially overcome at least one of the abovementioned disadvantages or provide the consumer with a useful or commercial choice.

With the foregoing in view, the present invention in one form, resides broadly in a turbine rotor assembly including a unitary body at least one inlet for inlet of a fluid into the rotor assembly and a plurality of flow channels extending through the unitary body and terminating in an outlet portion;

the at least one inlet in fluid communication with each of the plurality of flow channels to allow at least a portion of the fluid entering the body through the at least one fluid inlet to flow into each of the flow channels.

The turbine rotor assembly of the present invention is designed to be a medium speed, medium torque rotor assembly which has particular application when used to generate electricity. One of the primary advantages of the turbine rotor assembly of the present invention is that due to the features of the turbine, it does not require a reduction gear to operate an alternator. The rotor assembly is designed to rotate and is preferably associated with a shaft in order to create usable work which can then be used to generate electricity. The rotor assembly is preferably associated with the shaft via a magnetic coupling or similar type of coupling.

In the context of the present invention, the term "Medium-speed" means preferably above 100 revolutions per minute and closer to 6000 revolutions per minute. Given the moderate speed rotation of the rotor assembly and the potential for damage or injury should there be a bearing failure, the moderate-speed rotor of the present assembly is normally used within a closed housing, hence the use of a preferred magnetic coupling to associate the high-speed rotor with a shaft for take off of usable work.

It is preferred that the moderate speed turbine rotor assembly of the present invention is driven by a working fluid, and a preferred fluid is a refrigerant or a similar compressible and liquefiable vapour. The preferred working fluid is typically provided to the rotor assembly via the inlet, through to the flow channels in the rotor and out of the converging and diverging outlets defined in the rotor in order to drive moderate-speed rotation of the turbine rotor. The turbine of the present invention can also operate using a zeotropic fluid mixture.

The moderate-speed rotor of the present invention includes a body including a plurality of flow channels, each flow channel terminating in an outlet converging-diverging portion.

The turbine rotor assembly includes a unitary body with at least one inlet for inlet of a fluid into the rotor assembly and a plurality of flow channels extending through the unitary body and terminating in an outlet portion, the at least one inlet in fluid communication with each of the plurality of flow channels.

It is preferred that the body be substantially circular when viewed in one orientation and substantially conical or part conical (frustoconical) when viewed in a perpendicular orientation. It is particularly preferred that the body be frustoconical in shape but bell-shaped having an arcuate waist, rather than the substantially planar waist that a truly conical shape has.

In a preferred embodiment, the outlet portions of the plurality of flow channels are normally provided on a lateral side edge of the lip of the body. The outlet portions are preferably oriented substantially tangentially to the lip in order to create rotational force as the preferred working fluid or gas exits the outlet portions. The outlet portion preferably includes a converging-diverging nozzle so as to create the desired tangential thrust and cause the rotor to rotate.

The outlet portions of the respective flow channels are typically evenly staggered or offset slightly from one another in order to drive rotation.

It is preferred that the outlet portions are coplanar with one another in order to drive rotation in a balanced manner with most, if not all of the driving force applied in the same plane in order to create the maximum speed of rotation.

Preferably, each of the plurality of flow channels will be at least partially helical extending from a portion of the body adjacent to the inlet to the outlet portions of the plurality of flow channels preferably provided on a lateral side edge of the lip of the body.

Preferably, the flow channels will each extend from a portion of the body adjacent to the inlet of the preferred substantially conical or frustoconical body toward the peripheral lip but arc or curve away from the inlet as the flow channels extend toward the peripheral lip such that the terminus of the flow channel is substantially tangentially oriented relative to the lip. All of the flow channels typically extend in the same direction through the body. It is preferred that the plurality of flow channels formed in the body are equally spaced about the body.

Preferably, an even number of flow channels will be provided in the rotor assembly of the present invention. Normally, there will be 5 to 15 flow channels defined in the rotor assembly but the number of flow channels provided will typically depend upon the size of the rotor assembly with a larger rotor assembly including more flow channels than smaller rotor assemblies.

The plurality of flow channels is preferably arcuate in order to translate axial flow into the rotor assembly into radial flow to provide rotation of the rotor assembly. It is preferred that each of the flow channels is continually arcuate, preferably of substantially uniform dimension over their length and without obstructions nor other head loss-causing shapes such as orifices or any vortex or disturbance-creating shape. The flow from the entry to the flow channel to the nozzle should approximate ideal laminar flow as closely as possible.

It is further preferred that at least one, and typically a number of openings are provided into the body extending from a lower wall of the body to receive one or more fasteners to attach a magnetic coupling to the body. Preferably, the attachment openings are provided between adjacent flow channel parts or more preferred, between each second adjacent flow channel part.

In a particularly preferred embodiment having 5 or more flow channels, four attachment openings will be provided, one opening each for an elongate fastener which extends into the body.

A lower wall of body may extend substantially concentrically with the preferred arcuate waist of the body in order to minimise the amount of material used to form the body and thereby reduce the weight of the body. One or more thicker portions may be provided on the body if required to provide strength to the body.

As mentioned above, the body is preferably formed from a metallic or elastomeric material that can be sintered or 3D printed.

The flow channels may be inscribed or formed through an internal volume of the body. Machining processes such as metal routing could be used such as a CNC router but a particularly preferred method of forming the body is three-dimensional metal printing or sintering technology as this will allow formation of the unitary body with the flow channels formed therein.

Each of the plurality of flow channels provided in the body will preferably include at least one convergence zone. Preferably, a single convergence zone will be provided in each of the plurality of flow channels.

It is preferred that the preferred convergence zone in each flow channel is provided adjacent to but spaced from the outlet from each flow channel. The particular configuration of the flow channel with the convergence zone will preferably form a nozzle which is integrated into the flow channel when the rotor is formed. Functionally, the convergence zone will typically act to increase the velocity of the fluid flow in the convergence zone which will again help to maximise the speed of rotation of the rotor assembly. There is typically an arcuate transition between the flow channel and the convergence zone, preferably on at least the inlet side and preferably on both the inlet side and the outlet side of the convergence zone.

Each of the plurality of flow channels provided in the body will preferably include at least one divergence zone. Preferably, a single divergence zone will be provided in each of the plurality of flow channels.

It is preferred that the preferred divergence zone in each flow channel is provided adjacent to but spaced from the outlet from each flow channel. The particular configuration of the flow channel with the divergence zone will preferably form a nozzle which is integrated into the flow channel when the rotor is formed. Functionally, the divergence zone will typically act to increase the velocity of the fluid flow which will again help to maximise the speed of rotation of the rotor assembly. There is typically an arcuate transition between the flow channel and the divergence zone.

In a most preferred zone, each flow channel preferably includes an arcuate transition to a convergence zone and then diverges through an arcuate transition into a divergence zone closer to the outlet than the convergence zone. Preferably, the convergence zone will be approximately one half of the cross-sectional area of the flow channel and the divergence zone will be approximately the cross-sectional area of the flow channel. Importantly, each flow channel will preferably have a substantially uniform cross sectional area throughout the distance of travel without obstructions and only the preferred converging-diverging nozzle shaping the flow through the flow channel.

Preferably, the inlet is tubular and provides fluid to each of the plurality of flow channels. The preferred inlet is provided into the body, preferably substantially perpendicularly to the plane in which the outlets of the rotor assembly are provided.

It is particularly preferred that an inner terminus of the inlet will close the upper end of each of the plurality of flow channels such that fluid entering the rotor is forced to travel into at least one of the flow channels and preferably, into all of the flow channels equally.

The preferred inlet will be formed integrally with the preferred bell or 3D parabolic shaped body. The preferred inlet will normally rotate with the rotor assembly. If so, external locations are preferably provided on the inlet in order to mount the inlet for rotation.

In other configurations, the inlet may be formed separately from the body and may be fixed in position and the rotor rotates relative to the inlet but this is less preferred as the high-speed nature of the rotor may cause problems with sealing the inlet to the rotor if the inlet does not rotate with the rotor assembly.

It is envisaged that, in use, the turbine rotor assembly may be supported on one or more support members. Any suitable support members may be provided, although in a preferred embodiment of the invention, the one or more support members comprise bearings. Preferably, the bearings comprise rotating bearings, such that rotation of the turbine rotor assembly causes a corresponding rotation of the bearings. In a most preferred embodiment of the invention, two or more bearings may be provided.

The one or more bearings may be fabricated from any suitable material, although in a preferred embodiment of the invention, the one or more bearings may be fabricated from a relatively low-friction material. Thus, in some embodiments of the invention, the bearings may be fabricated from metal or polymer. In a specific embodiment of the invention, however, the bearings may be fabricated from ceramic.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DESCRIPTION OF EMBODIMENTS

According to a particularly preferred embodiment of the present invention, a rotor assembly is provided.

Figure 1:
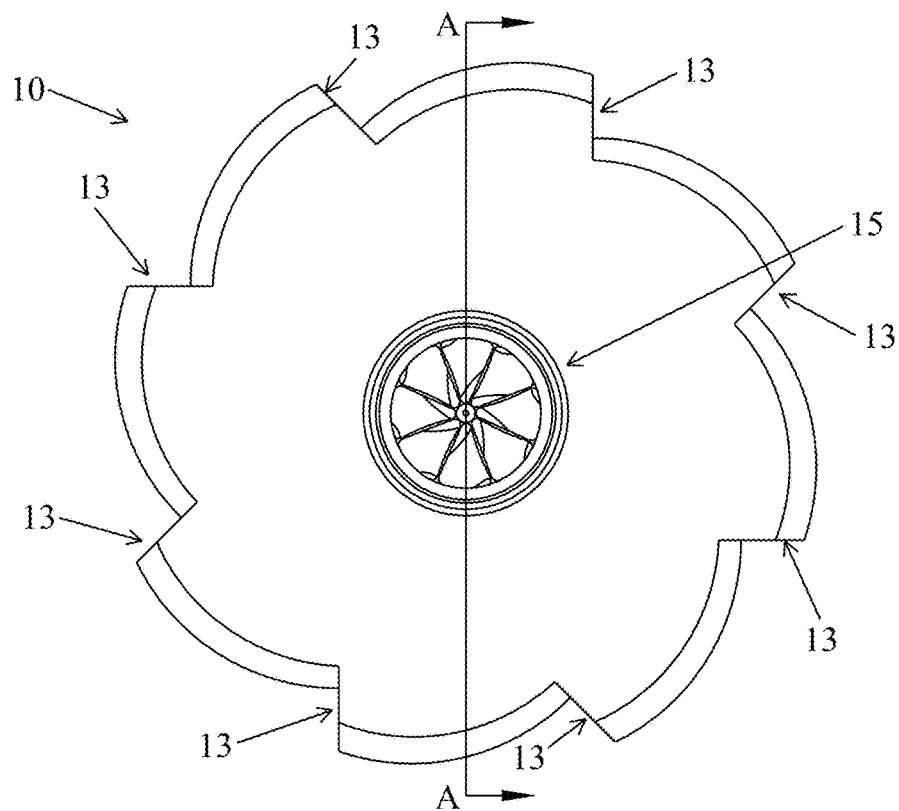
FIG. 1 is a plan view of a turbine rotor assembly according to a preferred embodiment of the present invention.
Figure 2:
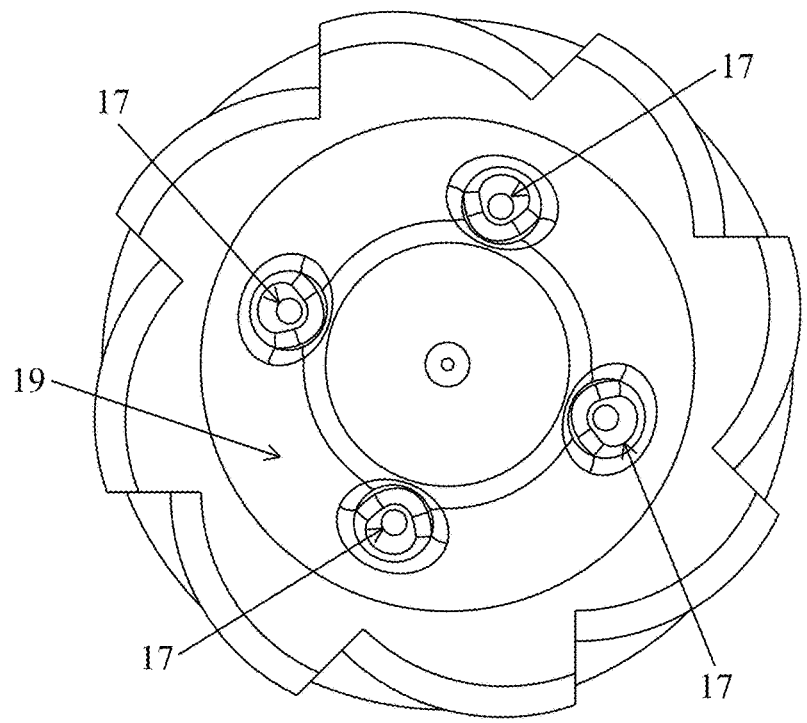
FIG. 2 is a view from the bottom of the turbine rotor assembly illustrated in FIG. 1.
Figure 3:
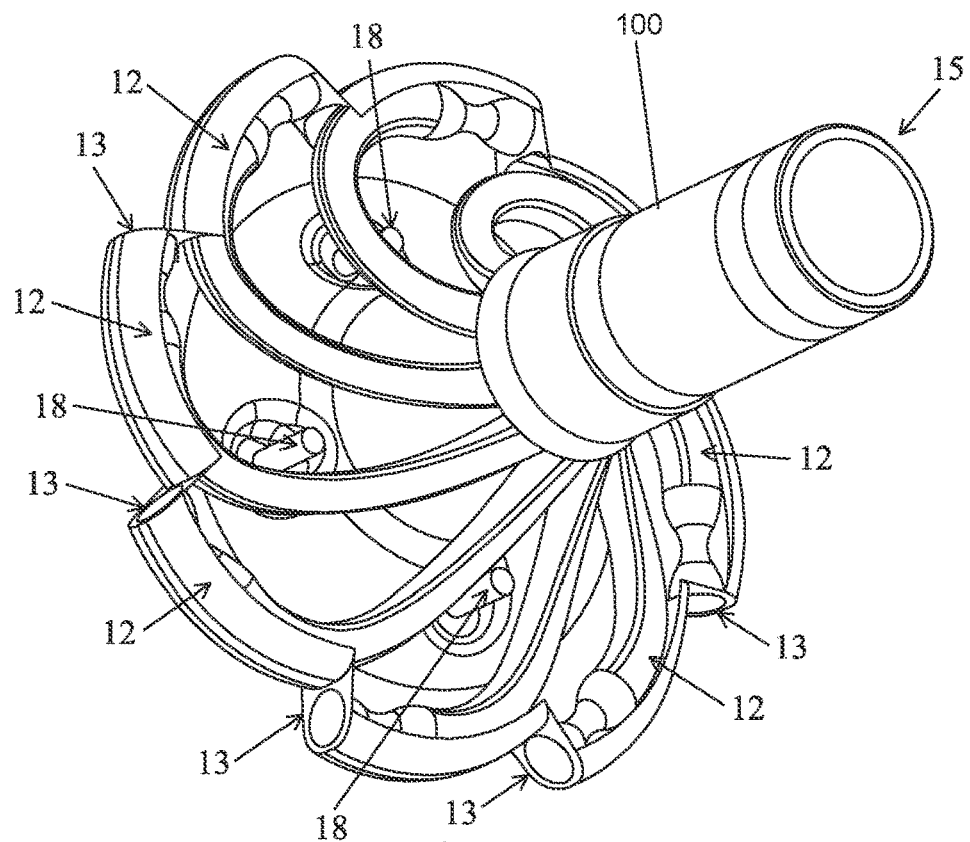
FIG. 3 is an axonometric view of the turbine rotor assembly illustrated in FIG. 1 with a top portion of the body partially rendered transparent for clarity purposes.
Figure 4:
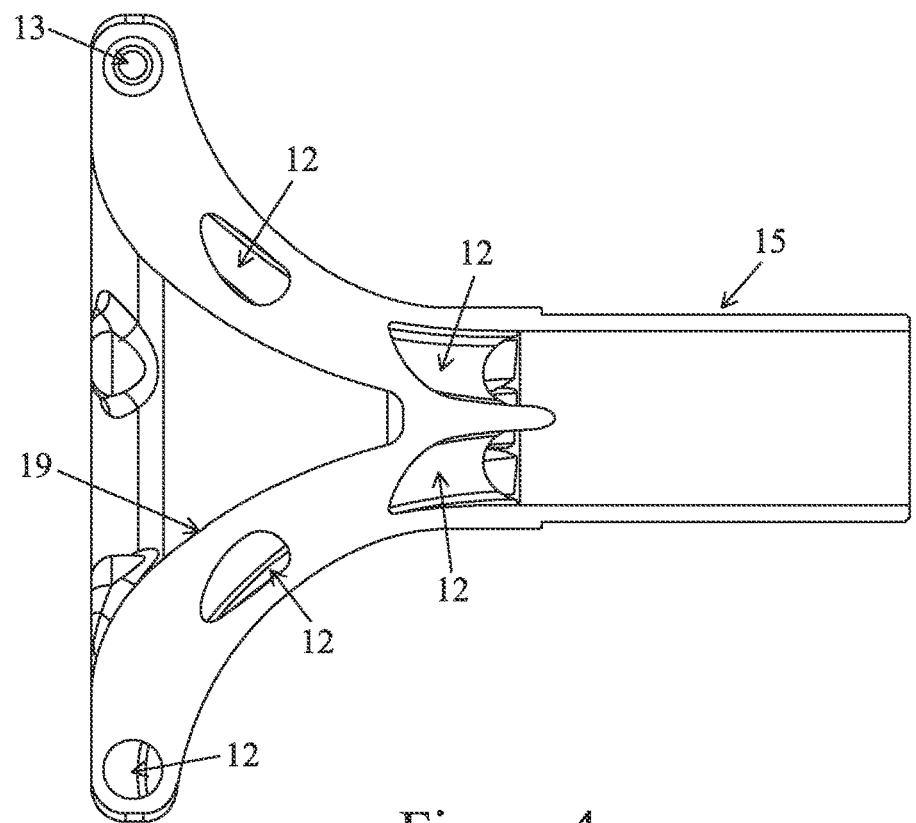
FIG. 4 is a sectional view of the turbine rotor assembly illustrated in FIG. 1 along line A-A.
Figure 5:
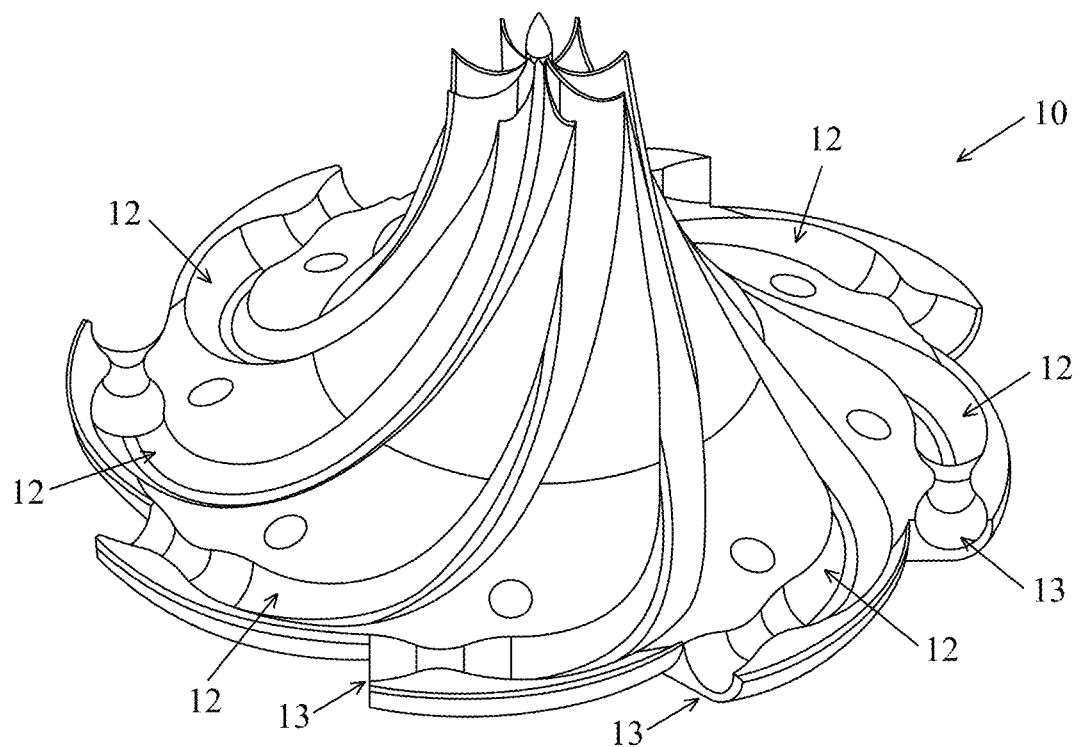
FIG. 5 is an isometric view of the body of a turbine rotor assembly according to a preferred embodiment of the present invention with the inlet and top portion of the body rendered transparent to view the internal workings.
Figure 6:
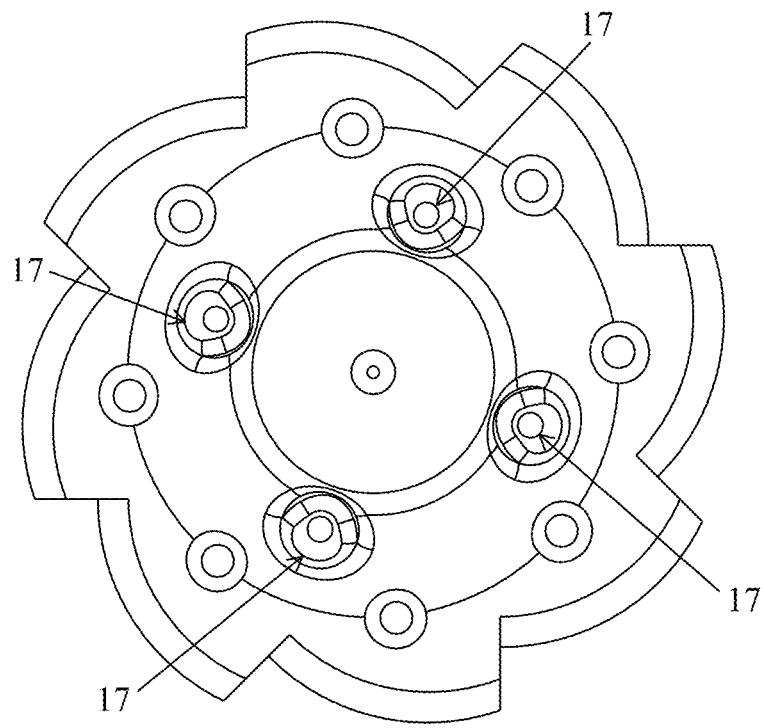
FIG. 6 is a view from beneath the body illustrated in FIG. 5.
Figure 7:
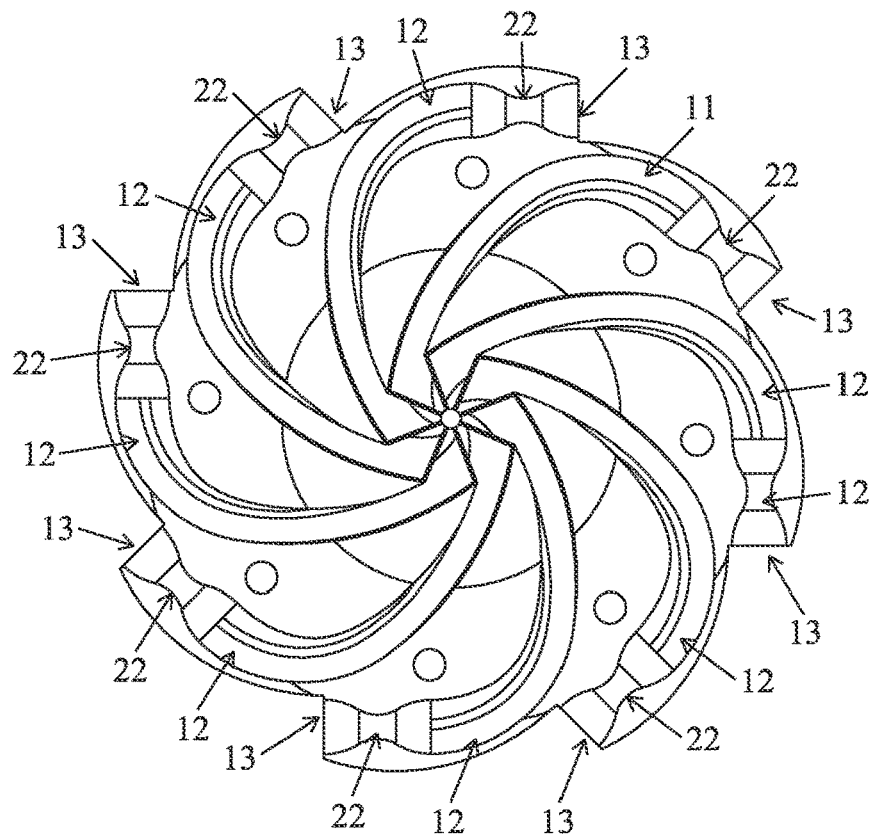
FIG. 7 is a plan view of the body illustrated in FIG. 5.
Figure 8:
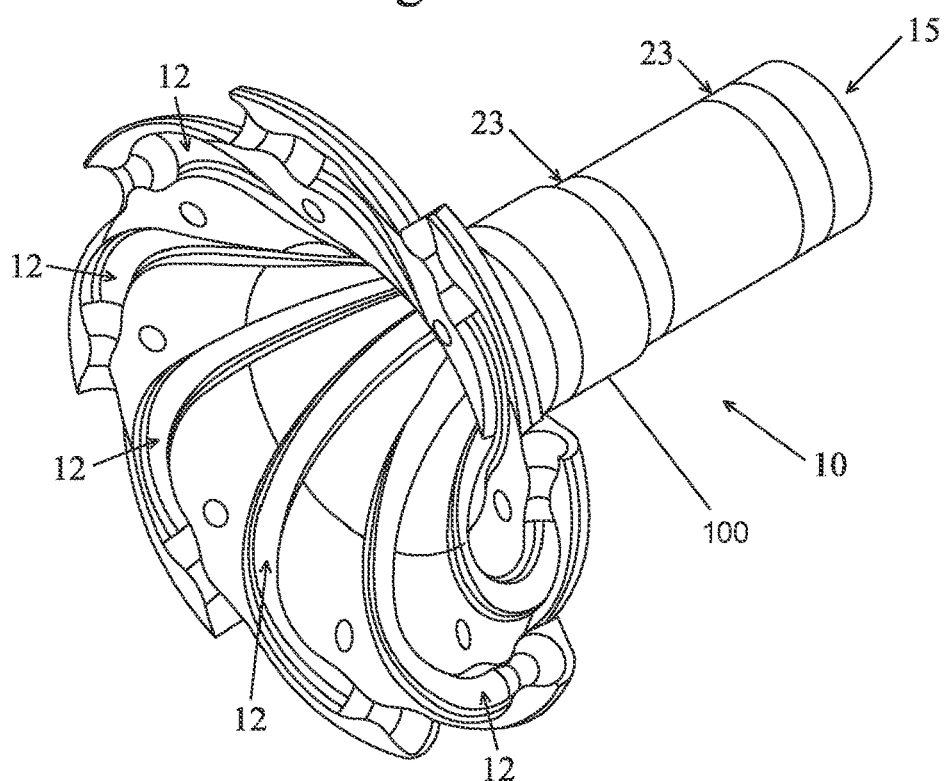
FIG. 8 is an isometric view of the turbine rotor assembly illustrated in FIG. 1 with a bottom portion of the body partially rendered transparent for clarity purposes.

The turbine rotor 10 illustrated in the accompanying Figures includes a unitary body, e.g., unitary body 100 in FIGS. 3 and 8, including at least one inlet 15 for inlet of a fluid into the rotor 10 and a plurality of flow channels 12 extending through the unitary body and terminating in an outlet 13, the at least one inlet 15 in fluid communication with each of the plurality of flow channels 12.

Figure 11:
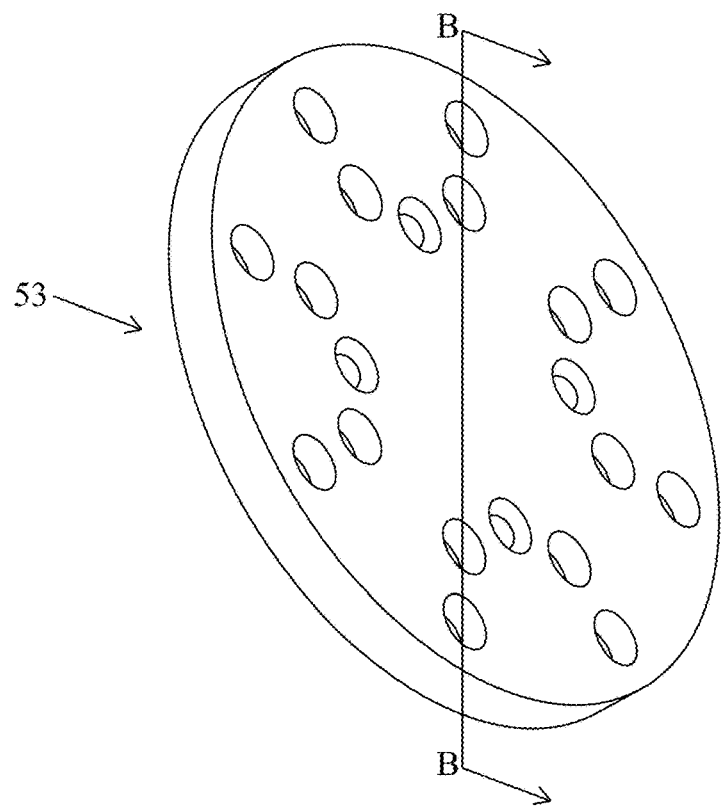
FIG. 11 is an isometric view of a magnetic coupling element according to a preferred embodiment of the present invention.
Figure 12:
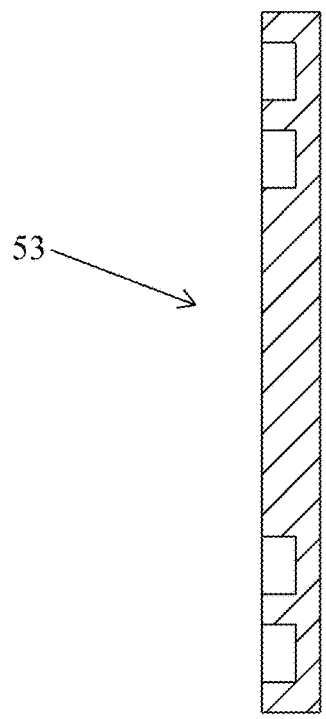
FIG. 12 is a side elevation view of the magnetic coupling element illustrated in FIG. 11 long line B-B.
Figure 13:
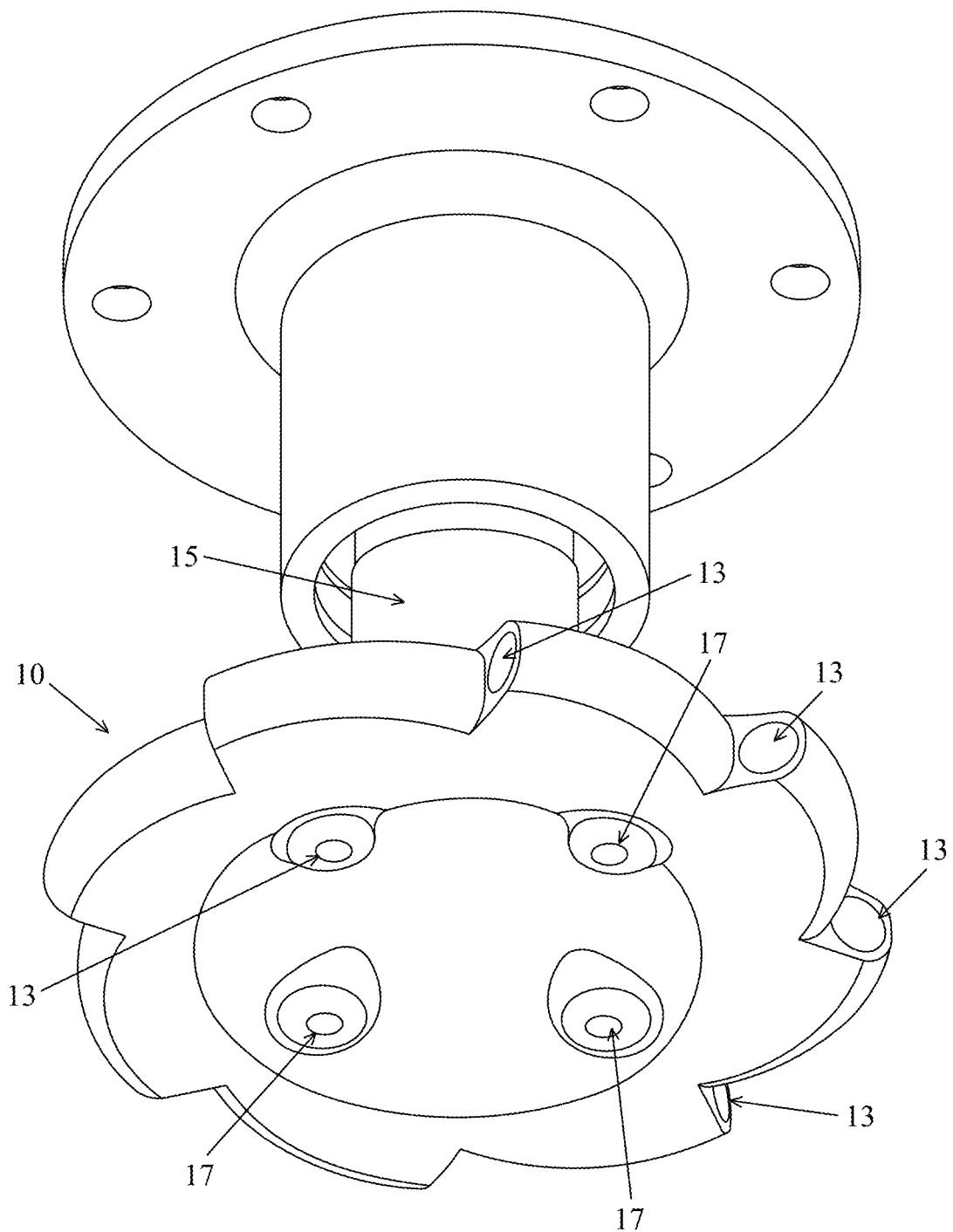
FIG. 13 is an isometric view of a turbine rotor assembly according to a preferred embodiment of the present invention.
Figure 14:
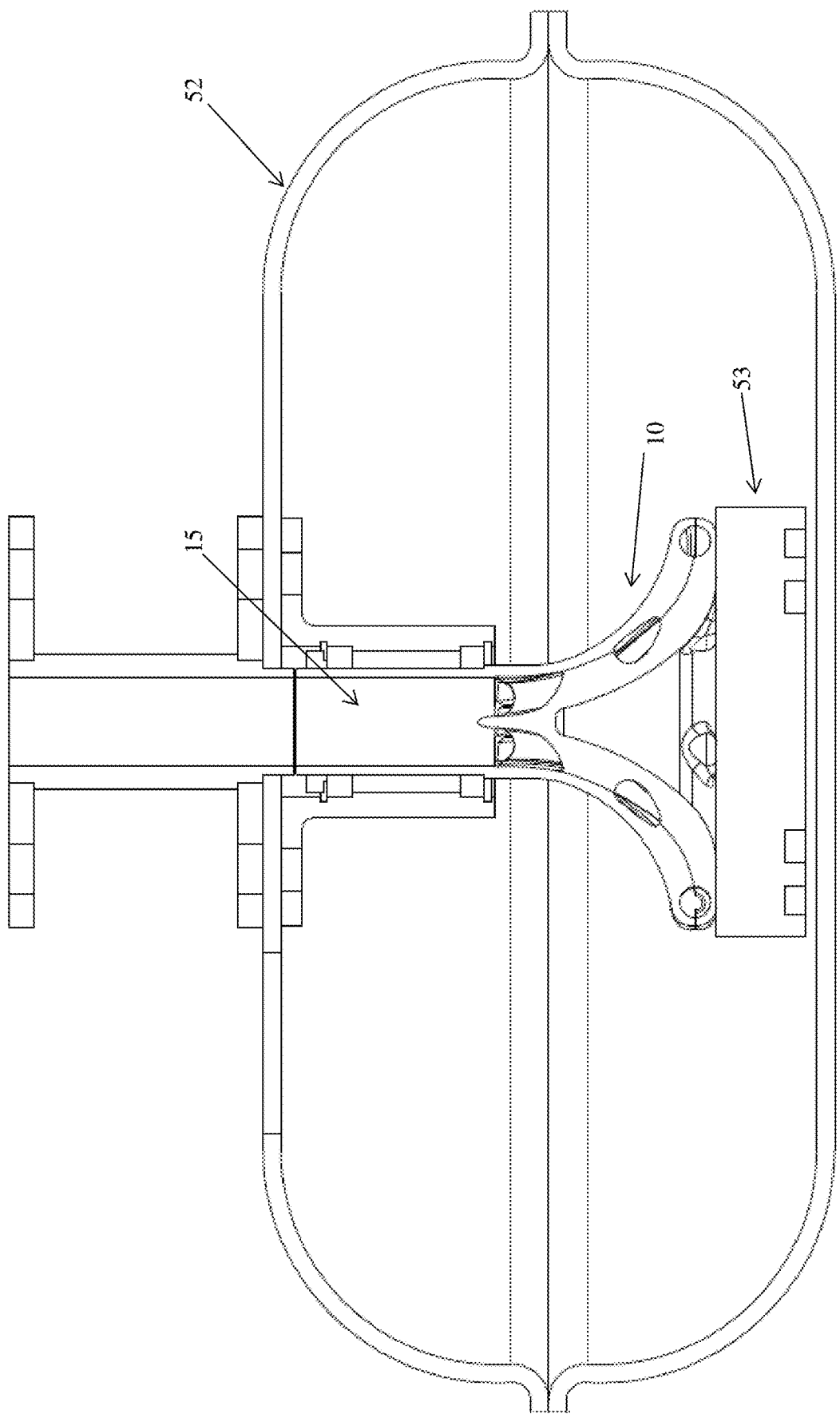
FIG. 14 is a sectional side elevation view of a turbine rotor assembly according to a preferred embodiment of the present invention inside a rotor housing.
Figure 15:
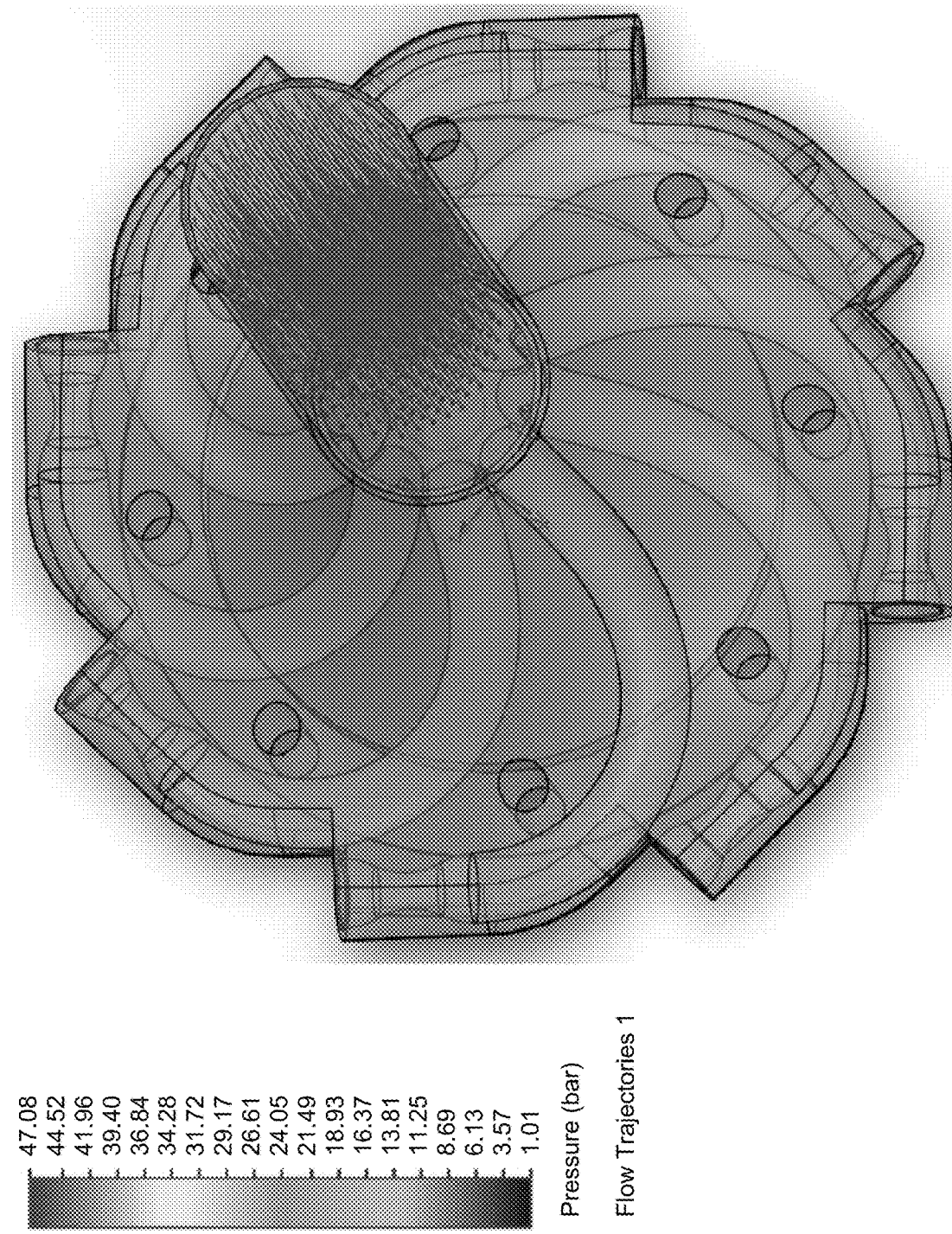
FIG. 15 is an isometric, partially transparent view of a turbine according to a preferred embodiment showing the flow pattern through the turbine in an initial period of flow.
Figure 16:
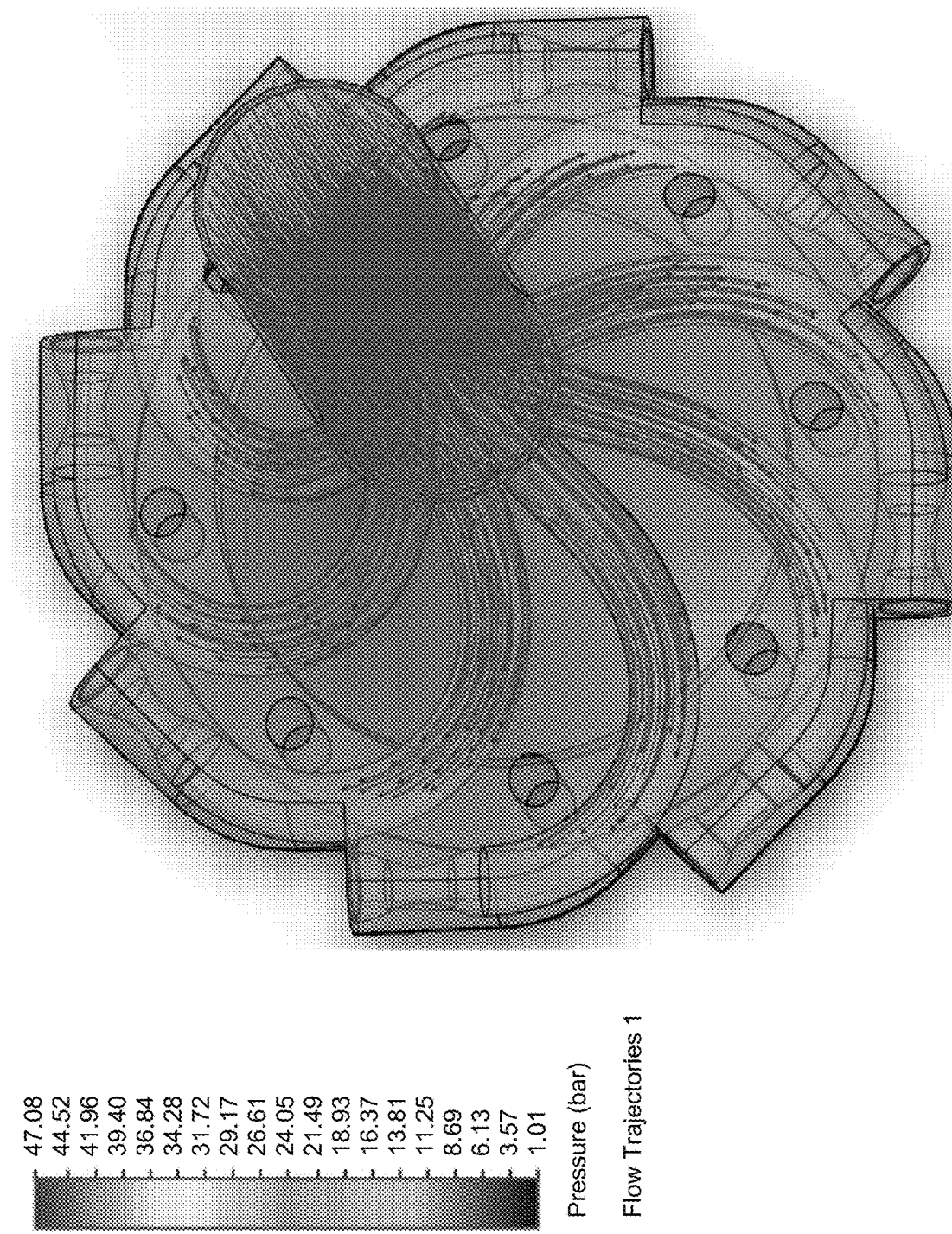
FIG. 16 is an isometric, partially transparent view of the turbine illustrated in FIG. 15 subsequent to FIG. 15 showing the flow pathways.
Figure 17:
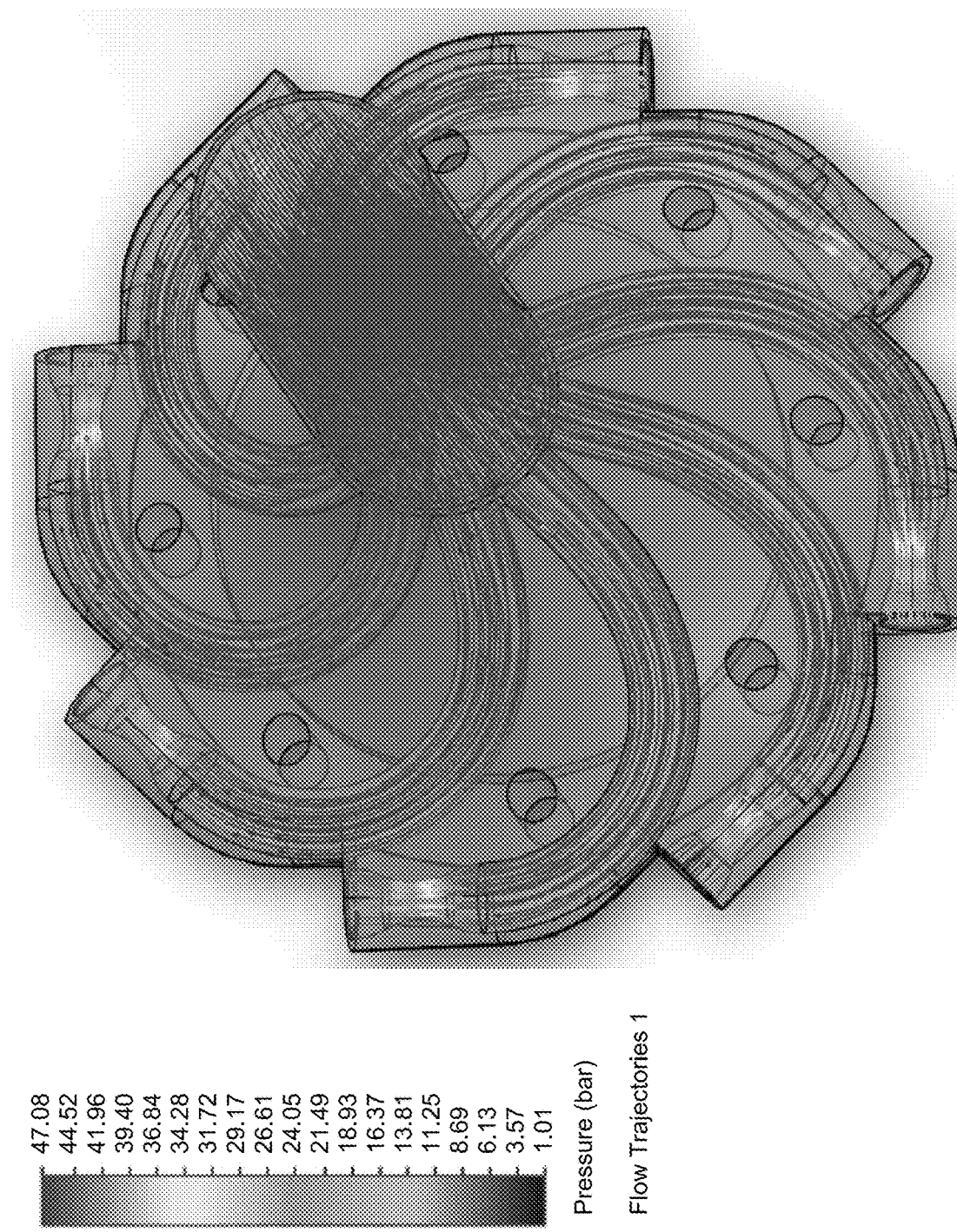
FIG. 17 is an isometric, partially transparent view of the turbine illustrated in FIG. 15 subsequent to FIG. 16 showing the flow pathways.
Figure 18:
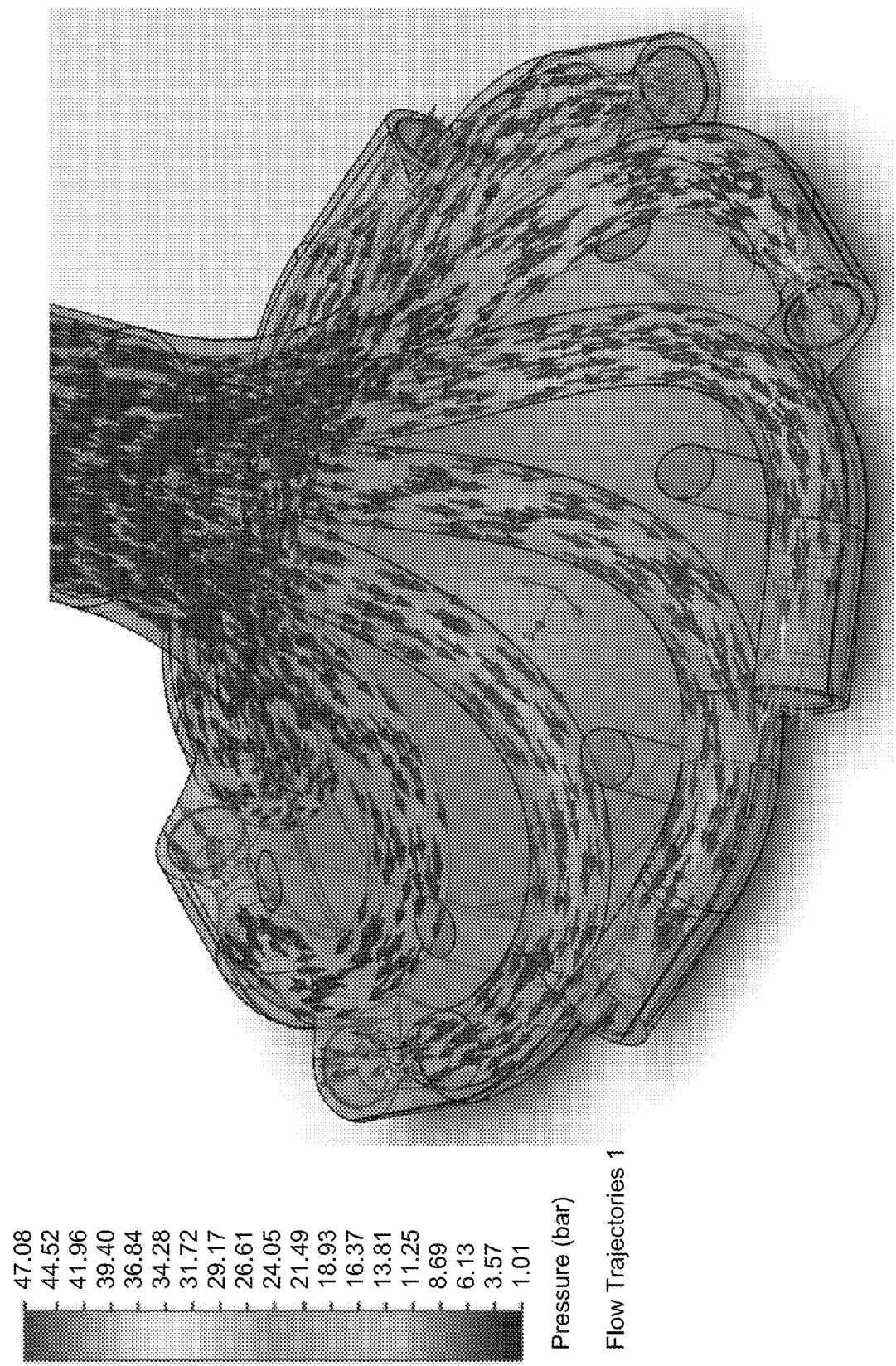
FIG. 18 is an alternative view of the turbine illustrated in FIG. 17 showing the flow pathways.
Figure 19:
FIG. 19 is a further alternative view of the turbine illustrated in FIG. 17 showing the flow pathways.

The turbine rotor assembly illustrated in FIG. 14 including the rotor 10 is designed to be a medium speed, medium torque rotor assembly which has particular application when used to generate electricity. The rotor is designed to rotate within the housing 52 and is associated with a takeoff shaft (not shown) in order to create usable work which can then be used to generate electricity. The rotor assembly is preferably associated with the takeoff shaft via a magnetic coupling 53 which is illustrated in more detail in FIGS. 11 and 12. Openings may be provided in the rotor 10 to attach the magnetic coupling directly to the rotor 10.

It is preferred that the moderate speed turbine rotor assembly of the present invention is driven by a working fluid, and a preferred fluid is a refrigerant or a similar compressible gas. The preferred working fluid is typically provided to the rotor assembly via the inlet, through to the flow channels in the rotor and out of the converging and diverging outlets defined in the rotor in order to drive moderate-speed rotation of the turbine rotor. The turbine of the present invention can also operate using a zeotropic fluid mixture.

The moderate-speed rotor of the present invention includes a unitary body including a plurality of flow channels 12, each flow channel 12 terminating in an outlet 13 associated with a converging-diverging portion.

As illustrated, the body is substantially circular when viewed in one orientation and substantially conical or part conical (frustoconical) when viewed in a perpendicular orientation. It is particularly preferred that the body be frustoconical in shape but bell-shaped having an arcuate waist, rather than the substantially planar waist that a truly conical shape has.

Figure 9:
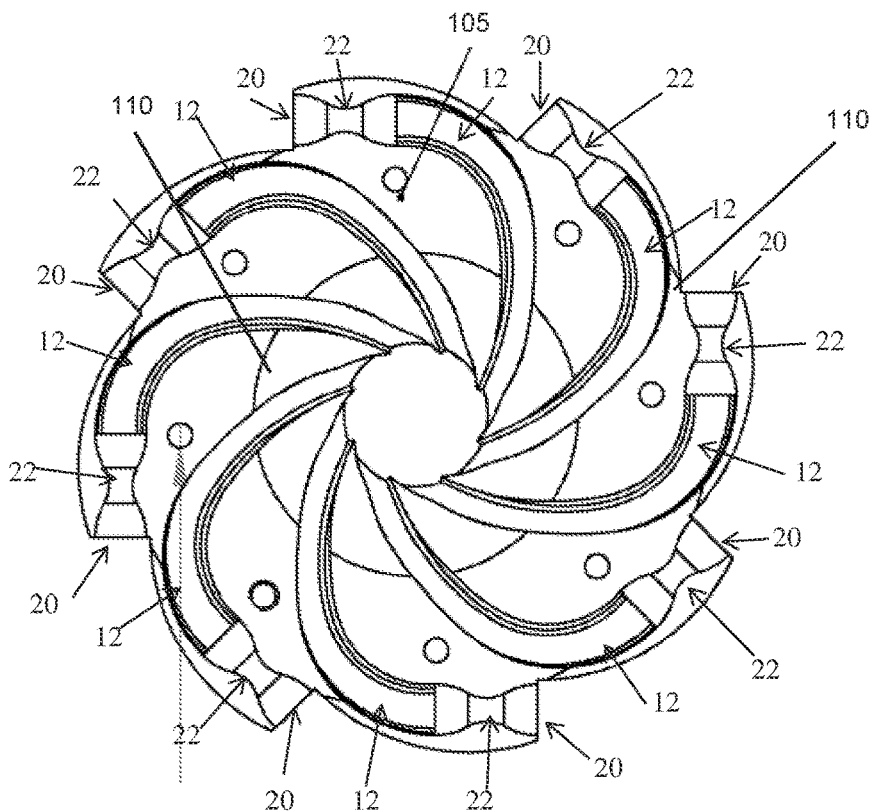
FIG. 9 is a view from beneath the body illustrated in FIG. 8.
Figure 10:
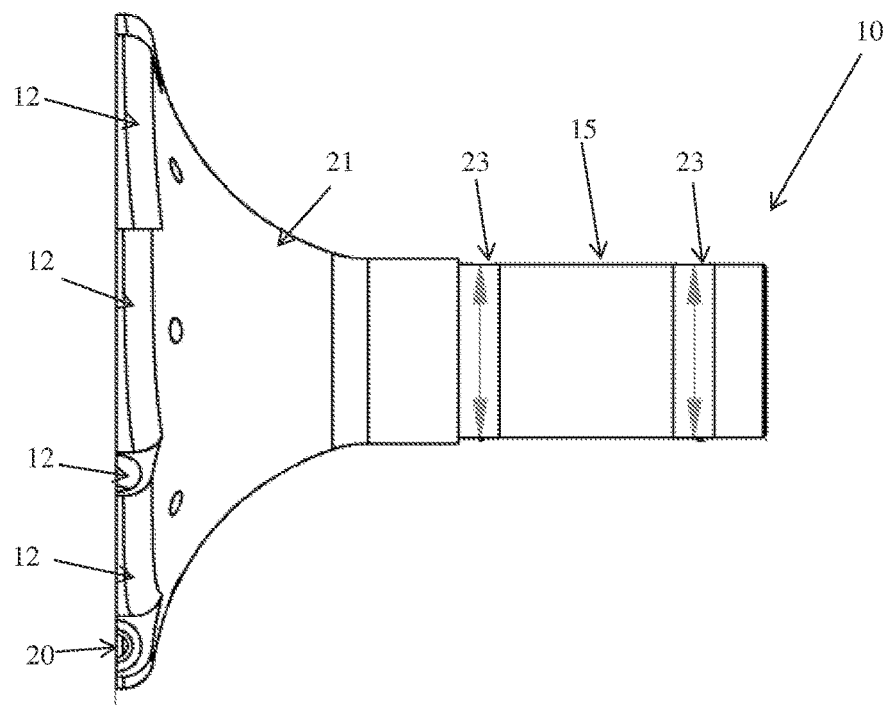
FIG. 10 is a side elevation view of the turbine rotor assembly illustrated in FIG. 1.

In a preferred embodiment, the outlets 13 of the plurality of flow channels 12 are normally provided on a lateral side edge of the lip, e.g., lateral side edges 110 of lip 105 in FIG. 9, of the body. The outlets 13 are preferably oriented substantially tangentially to the lip in order to create rotational force as the preferred working fluid or gas exits the outlet 13. Each of the outlets 13 is preferably associated with a converging-diverging nozzle so as to create the desired tangential thrust and cause the rotor to rotate.

The outlets 13 of the respective flow channels 12 are typically evenly staggered or offset slightly from one another in order to drive rotation.

It is preferred that the outlets 13 are coplanar with one another in order to drive rotation in a balanced manner with most, if not all of the driving force applied in the same plane in order to create the maximum speed of rotation.

Preferably, each of the plurality of flow channels 12 will be at least partially helical extending from a portion of the body adjacent to the inlet 15 to the outlets 13 of the plurality of flow channels 12 preferably provided on a lateral side edge of the lip of the body.

Preferably, the flow channels 12 will each extend from a portion of the body adjacent to the inlet 15 of the preferred substantially conical or frustoconical body toward the peripheral lip but arc or curve away from the inlet 15 as the flow channels 12 extend toward the peripheral lip such that the terminus of the flow channel 12 is substantially tangentially oriented relative to the lip. All of the flow channels 12 typically extend in the same direction through the body. It is preferred that the plurality of flow channels 12 formed in the body are equally spaced about the body.

Preferably, an even number of flow channels 12 will be provided in the rotor assembly of the present invention. Normally, there will be 5 to 15 flow channels 2 defined in the rotor assembly but the number of flow channels 12 provided will typically depend upon the size of the rotor assembly with a larger rotor assembly including more flow channels than smaller rotor assemblies.

The plurality of flow channels 12 are preferably arcuate in order to translate axial flow into the rotor assembly into radial flow to provide rotation of the rotor assembly.

It is further preferred that at least one, and typically a number of openings 17 are provided into the body extending from a lower wall of the body to receive one or more fasteners 18 to attach a magnetic coupling 53 to the body. Preferably, the attachment openings 17 are provided between adjacent flow channels 12 or more preferred, between each second adjacent flow channel 12.

In a particularly preferred embodiment having 5 or more flow channels, four attachment openings 17 will be provided, one opening each for an elongate fastener 18 which extends into the body.

A lower wall 19 of body may extend substantially concentrically with the preferred arcuate waist of the outer wall 21 of the body in order to minimise the amount of material used to form the body and thereby reduce the weight of the body. One or more thicker portions may be provided on the body if required to provide strength to the body.

As mentioned above, the body is preferably formed from a metal material. A particularly preferred method of forming the body is three-dimensional metal printing technology as this will allow formation of the unitary body with the flow channels 12 formed thereinto.

Each of the plurality of flow channels 12 provided in the body will preferably include an arcuate transition to a convergence zone 22 and then diverges through an arcuate transition into a divergence zone 20 closer to the outlet than the convergence zone 22. Preferably, the convergence zone 22 will be approximately one half of the cross-sectional area of the flow channel 12 and the divergence zone 20 will be approximately the cross-sectional area of the flow channel 12. Importantly, each flow channel 12 will preferably have a substantially uniform cross sectional area throughout the distance of travel without obstructions and only the preferred converging-diverging nozzle (formed from the preferred arcuate transition to convergence zone and then arcuate transition and divergence zone) shaping the flow through the flow channel 12.

Functionally, the converging-diverging nozzle acts to increase the velocity of the fluid flow which will again help to maximise the speed of rotation of the rotor assembly.

Preferably, the inlet 15 is tubular and provides fluid to each of the plurality of flow channels 12. The preferred inlet 15 is provided into the body, preferably substantially perpendicularly to the plane in which the outlets 13 of the rotor assembly are provided.

It is particularly preferred that an inner terminus of the inlet 15 will close the upper end of each of the plurality of flow channels 12 such that fluid entering the rotor is forced to travel into at least one of the flow channels 12 and preferably, into all of the flow channels 12 equally.

The preferred inlet will be formed integrally with the preferred bell shaped portion of the body. The preferred inlet will normally rotate with the rotor assembly. If so, external locations 23 are preferably provided on the inlet in order to mount the inlet for rotation.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A turbine rotor assembly including a unitary body including at least one inlet for inlet of a fluid into the rotor assembly and a plurality of flow channels extending through the unitary body and terminating in an outlet portion, the at least one inlet in fluid communication with each of the plurality of flow channels, wherein
   the unitary body is substantially circular when viewed in one orientation and bell-shaped having an arcuate waist when viewed in a perpendicular orientation,
   a respective outlet portion of each of the plurality of flow channels is provided on an outer lateral side edge of a lip of the unitary body, substantially tangentially to the outer lateral side edge of the lip in order to create rotational force and tangential thrust as the fluid exits the respective outlet portion,
   each of the plurality of flow channels is arcuate and continuous without obstruction between the at least one inlet and a converging-diverging nozzle in order to translate axial flow of the fluid into the rotor assembly into radial flow to provide rotation of the rotor assembly,
   each of the plurality of flow channels is discrete and completely separate from one another between the at least one inlet and the respective outlet portion,
   each of the plurality of flow channels is at least partially helical extending from a portion of the unitary body adjacent to the at least one inlet to each respective outlet portion of the plurality of flow channels,
   the unitary body is formed from a single piece construction formed from a metallic or an elastomeric material that is sintered or 3D printed.

2. A turbine rotor assembly as claimed in claim 1 associated with a shaft in order to create usable work used to generate electricity.

3. A turbine rotor assembly as claimed in claim 2 associated with the shaft via a magnetic coupling attached to the rotor assembly and which is magnetically associated with a magnetic coupling attached to the shaft.

4. A turbine rotor assembly as claimed in claim 1 wherein the turbine rotor assembly is driven by the fluid.

5. A turbine rotor assembly as claimed in claim 4 wherein the fluid is a compressible and liquefiable vapour.

6. A turbine rotor assembly as claimed in claim 4 wherein the fluid is a zeotropic fluid mixture.

7. A turbine rotor assembly as claimed in claim 1 wherein the respective outlet portion including the converging-diverging nozzle creates tangential thrust and causes the turbine rotor to rotate.

8. A turbine rotor assembly as claimed in claim 1 wherein each respective outlet portion is coplanar with one another to create a maximum speed of rotation.

9. A turbine rotor assembly as claimed in claim 1 further including an opening provided into the unitary body extending from a lower wall of the unitary body to receive a fastener to attach a magnetic coupling to the unitary body.

10. A turbine rotor assembly as claimed in claim 1 wherein a lower wall of body extends substantially concentrically with the arcuate waist of the unitary body in order to minimize the amount of material used to form the unitary body.

11. A turbine rotor assembly as claimed in claim 1 wherein each of the plurality of flow channels provided in the body includes at least one convergence zone.

12. A turbine rotor assembly as claimed in claim 11 wherein the at least one convergence zone in each flow channel is provided adjacent to but spaced from the outlet portion of each flow channel.

13. A turbine rotor assembly as claimed in claim 11 wherein:
   a divergence zone is provided in each flow channel adjacent to but spaced from the outlet portion of each flow channel downstream from the at least one convergence zone; and/or
   the at least one convergence zone is approximately one half of a cross-sectional area of each flow channel.

* * * * *